United States Patent
Choi et al.

(10) Patent No.: US 9,146,630 B2
(45) Date of Patent: Sep. 29, 2015

(54) NOISE SPECTRUM ESTIMATOR AND TOUCH SCREEN DEVICE INCLUDING THE SAME

(71) Applicants: Kwang-Ho Choi, Anyang-si (KR); Chang-Ju Lee, Suwon-si (KR)

(72) Inventors: Kwang-Ho Choi, Anyang-si (KR); Chang-Ju Lee, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 217 days.

(21) Appl. No.: 13/717,955

(22) Filed: Dec. 18, 2012

(65) Prior Publication Data

US 2013/0222290 A1  Aug. 29, 2013

(30) Foreign Application Priority Data

Feb. 28, 2012  (KR) .................. 10-2012-0020003

(51) Int. Cl.
*G06F 3/041* (2006.01)
*G06F 3/044* (2006.01)

(52) U.S. Cl.
CPC .............. *G06F 3/041* (2013.01); *G06F 3/044* (2013.01); *G06F 3/0418* (2013.01)

(58) Field of Classification Search
CPC ... G06F 3/03547; G06F 3/041; G06F 3/0412; G06F 3/0414; G06F 3/0418; G06F 3/044; G06F 3/046; G06F 3/047; G06F 2203/041

USPC ................... 345/173–178; 178/18.01–18.11
See application file for complete search history.

(56) References Cited

U.S. PATENT DOCUMENTS

| | | |
|---|---|---|
| 6,476,798 B1 | 11/2002 | Bertram et al. |
| 2008/0309628 A1 | 12/2008 | Krah et al. |
| 2010/0079401 A1 | 4/2010 | Staton |
| 2011/0050607 A1 | 3/2011 | Park |
| 2011/0115729 A1 | 5/2011 | Kremin et al. |
| 2011/0157060 A1 | 6/2011 | Yeh et al. |
| 2013/0027333 A1* | 1/2013 | Nagata ........................ 345/173 |
| 2013/0050132 A1* | 2/2013 | Calpe Maravilla et al. .. 345/174 |
| 2013/0176272 A1* | 7/2013 | Cattivelli et al. ............. 345/174 |

FOREIGN PATENT DOCUMENTS

| | | | |
|---|---|---|---|
| JP | 2001-125744 A | 5/2001 |
| JP | 2006-106853 A | 4/2006 |
| JP | 2010-282462 A | 12/2010 |
| KR | 10-2000-0052152 A | 8/2000 |
| KR | 10-2005-0070212 A | 7/2005 |
| KR | 10-2008-0013638 A | 2/2008 |

\* cited by examiner

*Primary Examiner* — Rodney Amadiz
(74) *Attorney, Agent, or Firm* — Lee & Morse, P.C.

(57) ABSTRACT

A noise spectrum estimator for a touch panel includes an adaptive impulse response generation unit configured to generate impulse response information by performing an adaptive training operation on noise data, the noise data being generated by sampling a plurality of noise signals received from the touch panel, and an estimation unit configured to generate noise frequency spectrum estimation information associated with the noise data by performing a fast Fourier transform (FFT) on the impulse response information.

19 Claims, 12 Drawing Sheets

NOISE SPECTRUM ESTIMATOR AND TOUCH SCREEN DEVICE INCLUDING THE SAME

CROSS-REFERENCE TO RELATED APPLICATION

This application claims priority under 35 USC §119 to Korean Patent Application No. 10-2012-0020003, filed on Feb. 28, 2012 in the Korean Intellectual Property Office (KIPO), the contents of which are herein incorporated by reference in their entirety.

BACKGROUND

1. Field

Example embodiments relate generally to noise spectrum estimators, and more particularly to noise spectrum estimators for touch panels, and touch screen devices including the noise spectrum estimators.

2. Description of the Related Art

Touch panels and touch screens are widely used in electronic devices to detect an input action or an event by a user. The user may use, e.g., fingers or stylus pens to touch the surface of the touch screen so that a desired function may be performed in the electronic device adopting the touch screen as an input means.

SUMMARY

Embodiments are directed to a noise spectrum estimator for a touch panel, including an adaptive impulse response generation unit configured to generate impulse response information by performing an adaptive training operation on noise data, the noise data being generated by sampling a plurality of noise signals received from the touch panel, and an estimation unit configured to generate noise frequency spectrum estimation information associated with the noise data by performing a fast Fourier transform (FFT) on the impulse response information.

First peak frequencies corresponding to first noise peak points may be substantially the same as second peak frequencies corresponding to second noise peak points, the first noise peak points being detected based on the noise frequency spectrum estimation information, the second noise peak points being obtained by directly performing the FFT on the noise data.

The noise spectrum estimator may further include a peak detection unit configured to detect the first peak frequencies by analyzing the noise frequency spectrum estimation information.

The adaptive impulse response generation unit may include an adaptive line enhancer filter.

The adaptive line enhancer filter may include a delay unit configured to generate delayed noise data by delaying the noise data, a calculation unit configured to generate second estimated noise data by subtracting first estimated noise data from the noise data, and an adaptive filter unit configured to generate the impulse response information and the first estimated noise data by performing the adaptive training operation based on the delayed noise data and the second estimated noise data.

A tab coefficient of the adaptive filter unit may be substantially the same as the number of FFT points for the FFT performed by the estimation unit.

Embodiments are also directed to a touch screen device, including a touch panel including a plurality of panel points for sensing respective input touch events, a signal processing unit configured to generate voltage data based on a plurality of sensing signals corresponding to changes of capacitances of the touch panel, a noise spectrum estimator configured to generate noise frequency spectrum estimation information based on the voltage data in a noise sensing mode, the voltage data including noise data in the noise sensing mode, a filter unit including a plurality of filters, the filter unit configured to select from among the plurality of filters based on a filter selection signal and generate filtered data by filtering the voltage data based on a selected filter in a touch sensing mode, and a touch panel control unit configured to generate the filter selection signal by analyzing the noise frequency spectrum estimation information in the noise sensing mode, and configured to provide a driving signal to the touch panel and determine a touch point among the panel points based on the filtered data in the touch sensing mode. The noise spectrum estimator may include an adaptive impulse response generation unit configured to generate impulse response information by performing an adaptive training operation on the noise data in the noise sensing mode, the noise data being generated by sampling a plurality of noise signals received from the touch panel, and an estimation unit configured to generate the noise frequency spectrum estimation information by performing a fast Fourier transform (FFT) on the impulse response information in the noise sensing mode.

The filter unit may include an averaging filter and a frequency filter, the filter unit selecting the averaging filter based on the filter selection signal when the noise frequency spectrum estimation information corresponds to uniform distribution, and the filter unit selecting the frequency filter based on the filter selection signal when the noise frequency spectrum estimation information corresponds to nonuniform distribution.

The frequency filter may include a filter selected from a finite impulse response (FIR) filter and an infinite impulse response (IIR) filter.

The touch panel control unit may detect peak frequencies corresponding to noise peak points by analyzing the noise frequency spectrum estimation information without the peak frequencies in the noise sensing mode, and may determine a frequency of the driving signal therefrom.

The touch panel control unit may generate a mode selection signal to determine an operation mode of the touch screen device.

The touch panel control unit may determine whether the filtered data correspond to noises in the touch sensing mode, the touch panel control unit changing the operation mode of the touch screen device from the touch sensing mode to the noise sensing mode based on the mode selection signal when the filtered data correspond to the noises, and the touch panel control unit determining the touch point among the panel points based on the filtered data when the filtered data do not correspond to the noises.

The signal processing unit may include a capacitive-to-voltage converter configured to generate a plurality of first voltage signals based on the plurality of sensing signals, an anti-aliasing filter configured to generate a plurality of second voltage signals based on the plurality of first voltage signals, and an analog-to-digital converter configured to generate the voltage data based on the plurality of second voltage signals.

The analog-to-digital converter may generate a third voltage signal by adding up at least two of the plurality of second voltage signals and may generate the voltage data by performing an analog-to-digital conversion operation on the third voltage signal.

The touch screen device may further include a display panel formed under the touch panel, and a display driving unit configured to control the display panel to display an image on the display panel.

Embodiments are also directed to a touch screen device having a panel configured to respond to a touch input, the panel having a touch sensor array, the device including a plurality of sensors in the touch sensor array, each sensor providing a respective voltage signal in response to a touch input thereto, and a noise spectrum estimator configured to receive voltage data from the respective voltage signals from the sensors, the noise spectrum estimator including an adaptive impulse response generation unit configured to generate impulse response information by performing an adaptive training operation on noise data of the voltage data, the noise data being generated by sampling a plurality of noise signals received from the sensors of the touch panel, the adaptive training operation including estimating a periodic noise component of the noise data using an adaptive filter unit, and an estimation unit configured to generate noise frequency spectrum estimation information associated with the noise data by performing a fast Fourier transform (FFT) on the impulse response information.

The voltage data may be derived from a change in capacitance in the sensors.

At least one filter may be applied to the voltage data so as to generate a signal indicative of an actual touch input, the at least one filter being selected from a group of one or more filters based on the noise frequency spectrum estimation information.

The signal indicative of an actual touch input may be used to generate a touch event in a microprocessor of the device.

Estimating the periodic noise component of the noise data using the adaptive filter unit may include processing the noise data using a finite impulse response filter.

BRIEF DESCRIPTION OF THE DRAWINGS

Features will become apparent to those of skill in the art by describing in detail example embodiments with reference to the attached drawings in which.

DETAILED DESCRIPTION

Figure 1:
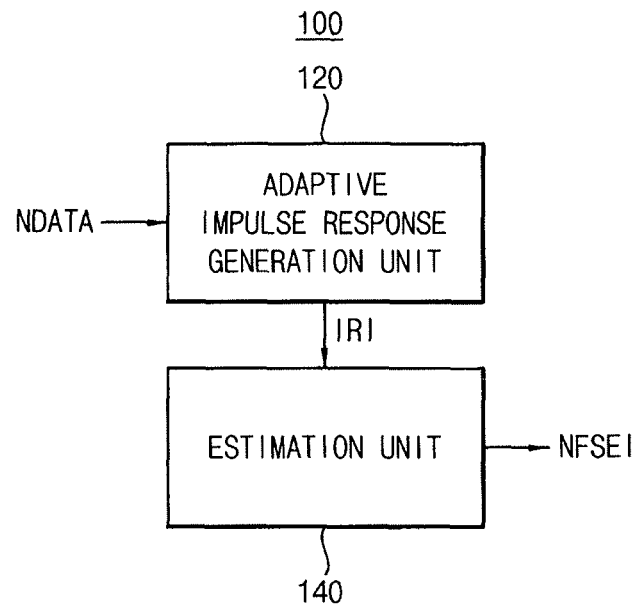
FIG. 1 illustrates a block diagram of a noise spectrum estimator according to example embodiments.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a block diagram of a noise spectrum estimator according to example embodiments.

The noise spectrum estimator according to example embodiments may be included in a touch screen device. The noise spectrum estimator according to example embodiments may be applied to estimate noises in a touch panel included in the touch screen device. A driving frequency of the touch panel may be determined based on the estimation results. Hereinafter, the noise spectrum estimator according to example embodiments will be described based on a capacitive touch screen device. However, the noise spectrum estimator according to example embodiments may be applied in other types of touch screen devices, such as a resistive touch screen device, a surface acoustic wave touch screen device, an infrared touch screen device, and so on.

In the example embodiment shown in FIG. 1, a noise spectrum estimator 100 for a touch panel includes an adaptive impulse response generation unit 120 and an estimation unit 140.

The adaptive impulse response generation unit 120 may generate impulse response information IRI by performing an adaptive training operation on noise data NDATA. The noise data NDATA may be generated by sampling (e.g., sensing, filtering, and analog-to-digital (A-D) converting) a plurality of noise signals received from the touch panel. The noise data NDATA may include digital values. The generation of the noise data NDATA is described below with reference to FIG. 8.

The estimation unit 140 may generate noise frequency spectrum estimation information NFSEI associated with the noise data NDATA by performing a fast Fourier transform (FFT) on the impulse response information IRI.

As will be described below with reference to FIGS. 3E, 3F, 4A and 4B, first noise peak points and first peak frequencies corresponding to first noise peak points may be detected by analyzing the noise frequency spectrum estimation information NFSEI. Here, a noise peak point may indicate one of a plurality of points included in a graph of noise frequency spectrum. The noise peak point may have a value greater than a noise threshold value and greater than values of neighboring points (e.g., previous and subsequent points). A peak frequency may indicate a frequency with respect to the noise peak point in the graph of the noise frequency spectrum. The first peak frequencies may be substantially the same as second peak frequencies corresponding to second noise peak points. The second noise peak points may be obtained by directly performing the FFT on the noise data NDATA.

Touch screen devices including touch panels are widely used in mobile applications. Characteristics of noises in the mobile applications, e.g., characteristics of noises in the touch panels, may vary depending on changes of times and spaces. For best function of the touch screen devices, it is desirable to analyze the noises in the touch panel, and to cancel and/or remove the noises in the touch panel before touch events (e.g., touch input actions) on the touch panels are detected.

The noise spectrum estimator 100 for the touch panel according to example embodiments may generate the impulse response information IRI by performing the adaptive training operation on the noise data NDATA, and generate the noise frequency spectrum estimation information NFSEI by performing the FFT on the impulse response information IRI. In addition, the first peak frequencies detected based on the noise frequency spectrum estimation information NFSEI may be substantially the same as the second peak frequencies obtained by directly performing the FFT on the noise data NDATA. Accordingly, the amount of calculation of the noise spectrum estimator 100 may be reduced, and the noise spectrum estimator 100 may be implemented with a relatively simple structure, and may accurately and efficiently analyze the characteristics of the noises in the touch panel. Moreover, as will be described below with reference to FIG. 8, a driving frequency of the touch panel may be determined based on the first peak frequencies (e.g., except the first peak frequencies) detected from the noise frequency spectrum estimation information NFSEI, and thus a touch screen device including the noise spectrum estimator 100 may accurately and efficiently detect the touch events.

Figure 2:
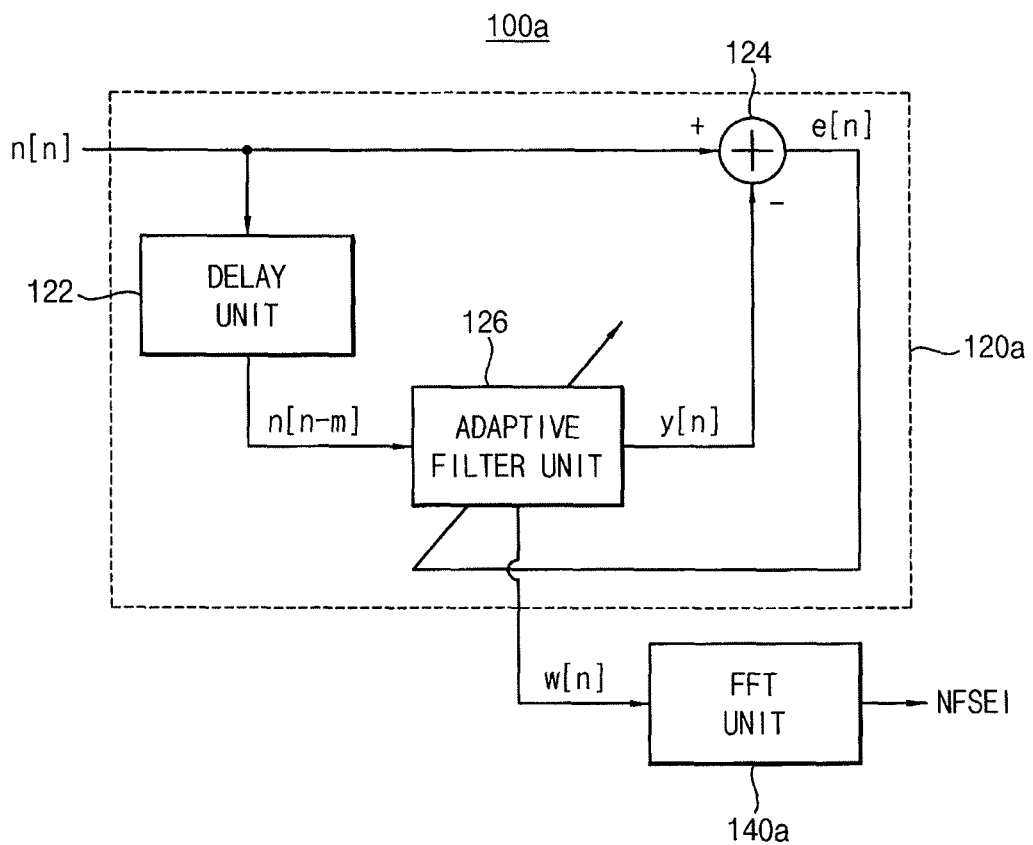
FIG. 2 illustrates a block diagram of an example of the noise spectrum estimator of FIG. 1.

FIG. 2 illustrates a block diagram of an example of the noise spectrum estimator of FIG. 1.

In the example embodiment shown in FIG. 2, a noise spectrum estimator 100a for a touch panel includes an adaptive impulse response generation unit and an estimation unit.

The adaptive impulse response generation unit may include an adaptive line enhancer filter 120a. The adaptive line enhancer filter 120a may include a delay unit 122, a calculation unit 124, and an adaptive filter unit 126.

The delay unit 122 may generate delayed noise data n[n−m] by delaying noise data n[n] by a predetermined delay m. The predetermined delay m may correspond to a programmable correlation factor.

The calculation unit 124 may generate second estimated noise data e[n] by subtracting first estimated noise data y[n] from the noise data n[n]. The first estimated noise data y[n] may be provided from the adaptive filter unit 126, and may be data estimated with respect to dominant noise components (e.g., periodic noise components) in the noise data n[n]. The second estimated noise data e[n] may be data estimated with respect to nondominant noise components (e.g., random noise components) in the noise data n[n].

The adaptive filter unit 126 may generate impulse response information w[n] and the first estimated noise data y[n] by performing the adaptive training operation based on the delayed noise data n[n−m] and the second estimated noise data e[n]. Here, the adaptive training operation indicates that the impulse response information w[n] is generated by analyzing the noise data n[n] during a sufficiently long time period. For example, algorithms for minimizing a mean square error (MSE), e.g., a least mean square (LMS) algorithm, or a recursive least square (RLS) algorithm, may be applied in the adaptive training operation.

In an example embodiment, the adaptive filter unit 126 may include an adaptive finite impulse response (FIR) filter that has an arbitrary tab coefficient. In this case, the impulse response information w[n], the first estimated noise data y[n] and the second estimated noise data e[n] may be represented by Equations 1, 2 and 3, respectively:

$$w[n+1]=w[n]+2\mu n[n]e[n] \quad \text{[Equation 1]}$$

$$y[n]=\sum_{k=0}^{M-1} n[n-k]w_k[n] \quad \text{[Equation 2]}$$

$$e[n]=n[n]-y[n] \quad \text{[Equation 3]}$$

In Equation 1, μ indicates a programmable convergence factor. In Equation 2, M indicates a tab coefficient of the adaptive FIR filter.

The estimation unit may include a FFT unit 140a. The FFT unit 140a may generate noise frequency spectrum estimation information NFSEI by performing the FFT on the impulse response information w[n]. The FFT unit 140a may perform the FFT on the impulse response information w[n] by predetermined FFT points.

In an example embodiment, the tab coefficient of the adaptive filter unit 126 may be substantially the same as the number of FFT points for the FFT performed by the FFT unit 140a. For example, when the tab coefficient of the adaptive filter unit 126 is about 64, e.g., when the adaptive filter unit 126 is implemented with 64-tab FIR filter, the number of FFT points for the FFT performed by the FFT unit 140a may be about 64.

Figure 3A:
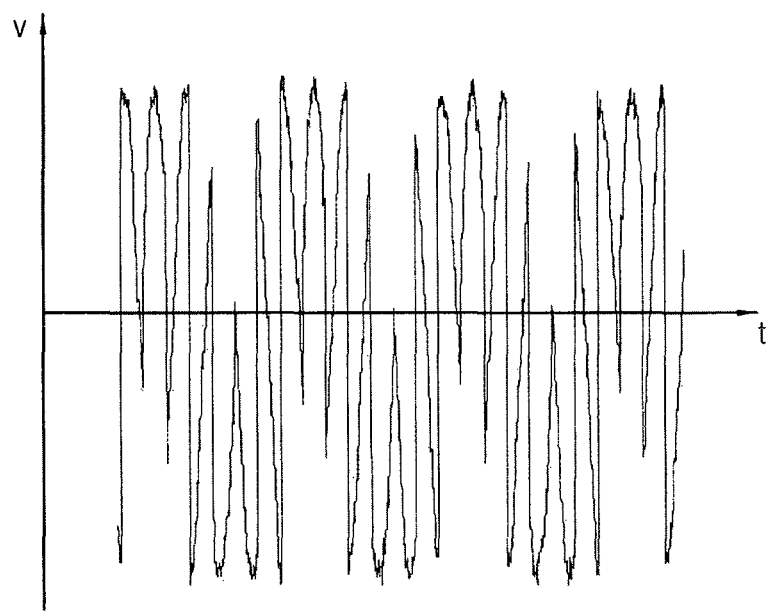
FIGS. 3A, 3B, 3C, 3D, 3E, 3F, 4A, and 4B are diagrams of an operation of the noise spectrum estimator of FIG. 2.
Figure 3B:
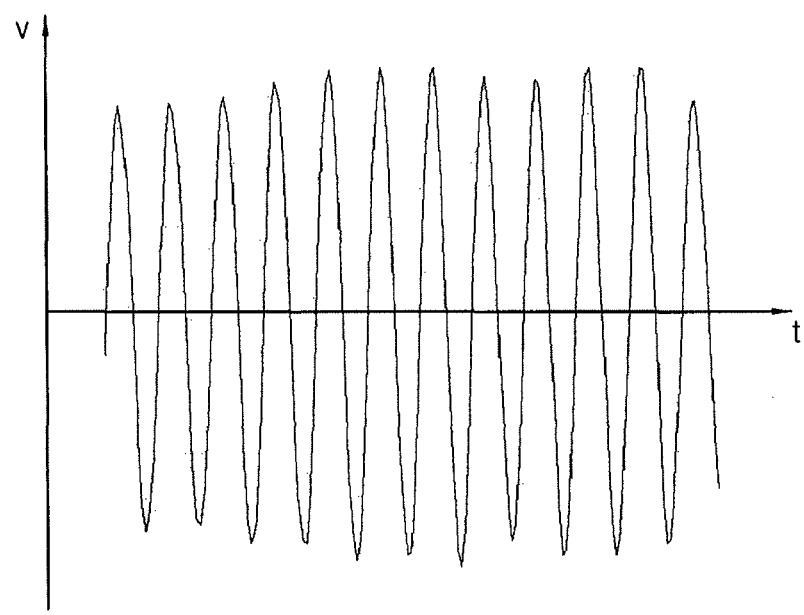
Figure 3C:
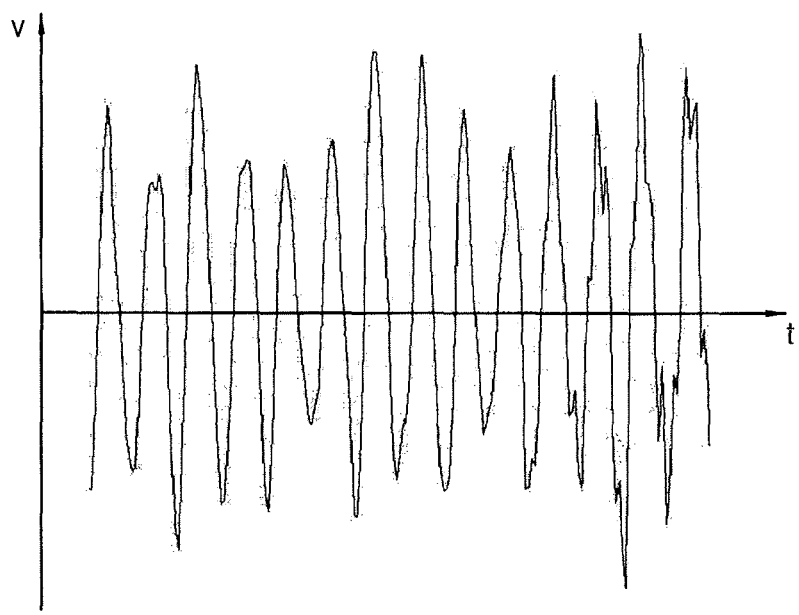
Figure 3D:
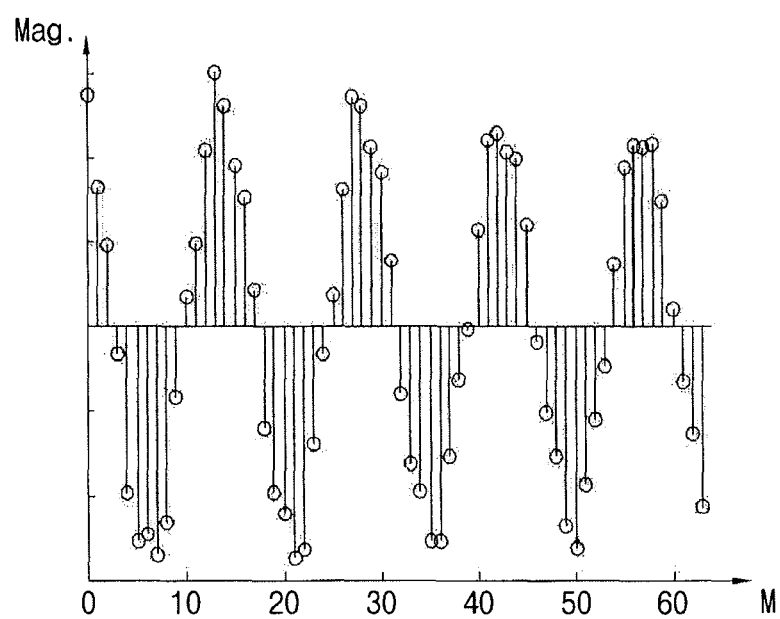
Figure 3E:
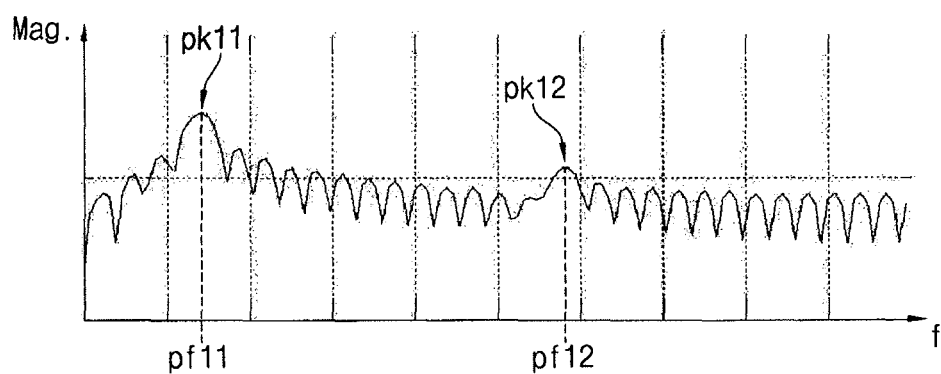
Figure 3F:
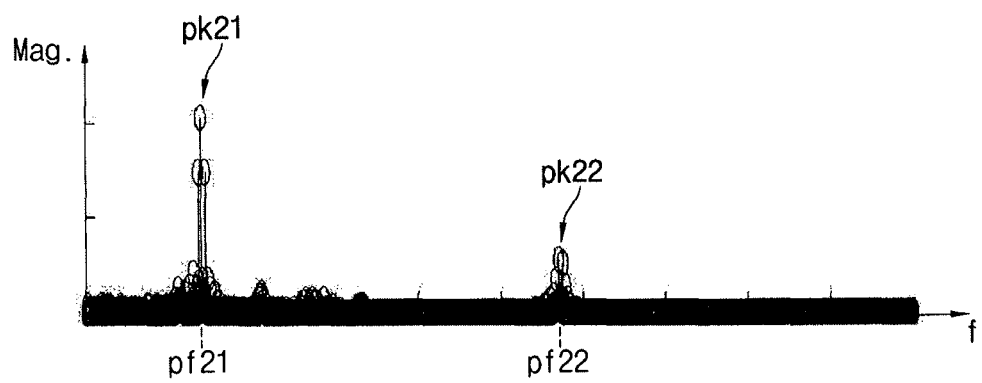
Figure 4A:
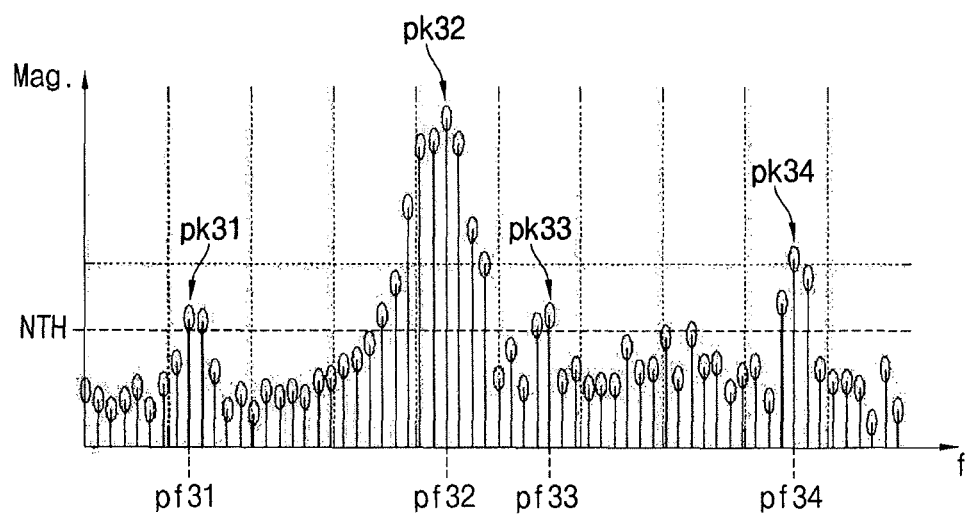
Figure 4B:
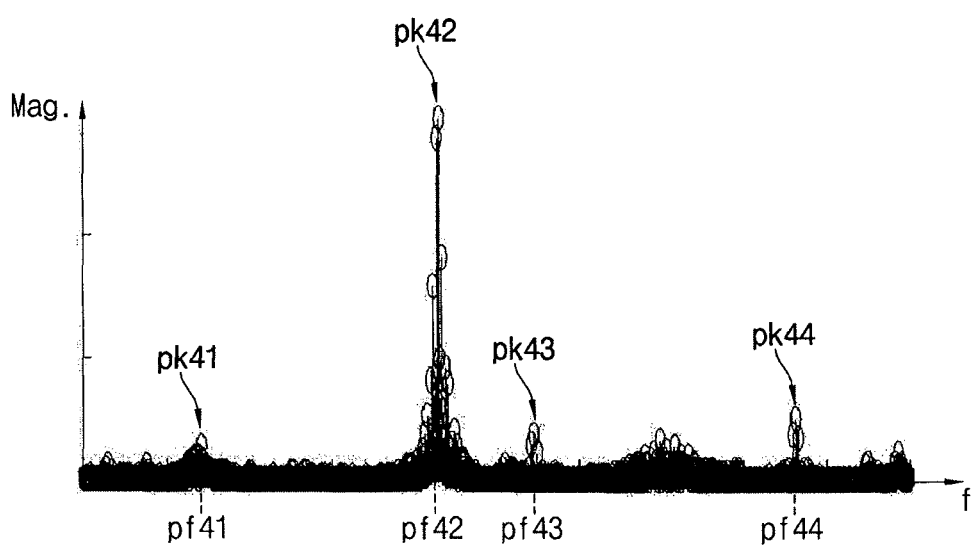

FIGS. 3A, 3B, 3C, 3D, 3E, 3F, 4A, and 4B illustrate diagrams for describing an operation of the noise spectrum estimator of FIG. 2. FIG. 3A is a graph corresponding to the noise data n[n]. FIG. 3B is a graph corresponding to the first estimated noise data y[n]. FIG. 3C is a graph corresponding to the second estimated noise data e[n]. FIG. 3D is a graph corresponding to the impulse response information w[n]. FIG. 3E is a graph of an example of the noise frequency spectrum estimation information NFSEI. FIG. 3F is a graph obtained by directly performing the FFT on noise data corresponding to the graph of FIG. 3E. FIG. 4A is a graph of another example of the noise frequency spectrum estimation information NFSEI. FIG. 4B is a graph obtained by directly performing the FFT on noise data corresponding to the graph of FIG. 4A.

Referring to FIGS. 2, 3A, 3B, 3C, 3D, 3E, and 3F, the noise data of FIG. 3A may be divided into the first estimated noise data (e.g., the periodic noise components) of FIG. 3B and the second estimated noise data (e.g., the random noise components) of FIG. 3C based on the adaptive training operation of the adaptive line enhancer filter 120a. The impulse response information of FIG. 3D may be obtained from the noise data of FIG. 3A based on the adaptive training operation of the adaptive line enhancer filter 120a.

The noise frequency spectrum estimation information of FIG. 3E may be obtained from the impulse response information of FIG. 3D based on 64-points FFT of the FFT unit 140a. First noise peak points pk11, pk12 and first peak frequencies pf11, pf12 corresponding to the first noise peak points pk11, pk12 may be detected by analyzing the noise frequency spectrum estimation information of FIG. 3E.

The graph of FIG. 3F may be obtained by directly performing the FFT on the noise data of FIG. 3A. Second noise peak points pk21, pk22 and second peak frequencies pf21, pf22 corresponding to the second noise peak points pk21, pk22 may be obtained by analyzing the graph of FIG. 3F. As illustrated in FIGS. 3E and 3F, the first peak frequencies pf11, pf12 detected from the noise frequency spectrum estimation information may be substantially the same as the second peak frequencies pf21, pf22 obtained by directly performing the FFT on the noise data of FIG. 3A, respectively. For example, the peak frequency pf11 may be substantially the same as the peak frequency pf21, and the peak frequency pf12 may be substantially the same as the peak frequency pf22.

Referring to FIGS. 4A and 4B, the noise frequency spectrum estimation information of FIG. 4A may be obtained based on the adaptive training operation on noise data and the FFT on the impulse response information corresponding to the noise data. First noise peak points pk31, pk32, pk33, pk34 and first peak frequencies pf31, pf32, pf33, pf34 corresponding to the first noise peak points pk31, pk32, pk33, pk34 may be detected by analyzing the noise frequency spectrum estimation information of FIG. 4A. Each of the first noise peak points pk31, pk32, pk33, pk34 may have a value greater than a noise threshold value NTH and greater than values of neighboring points (e.g., previous and subsequent points). The graph of FIG. 4B may be obtained by directly performing the FFT on the noise data. Second noise peak points pk41, pk42, pk43, pk44 and second peak frequencies pf41, pf42, pf43, pf44 corresponding to the second noise peak points pk41, pk42, pk43, pk44 may be obtained by analyzing the graph of FIG. 4B. The first peak frequencies pf31, pf32, pf33, pf34 detected from the noise frequency spectrum estimation information may be substantially the same as the second peak frequencies pf41, pf42, pf43, pf44 obtained by directly performing the FFT on the noise data, respectively.

As described above with reference to FIGS. 3A, 3B, 3C, 3D, 3E, 3F, 4A, and 4B, the first peak frequencies (obtained using the noise spectrum estimator 100a according to example embodiments) may be substantially the same as the second peak frequencies (obtained by directly performing the FFT on the noise data). In addition, the first peak frequencies may be obtained with a relatively small amount of calculation whereas the second peak frequencies may be obtained with a relatively great amount of calculation. Thus, the noise spectrum estimator 100a may have a relatively high operation speed and a relatively small size.

Figure 5:
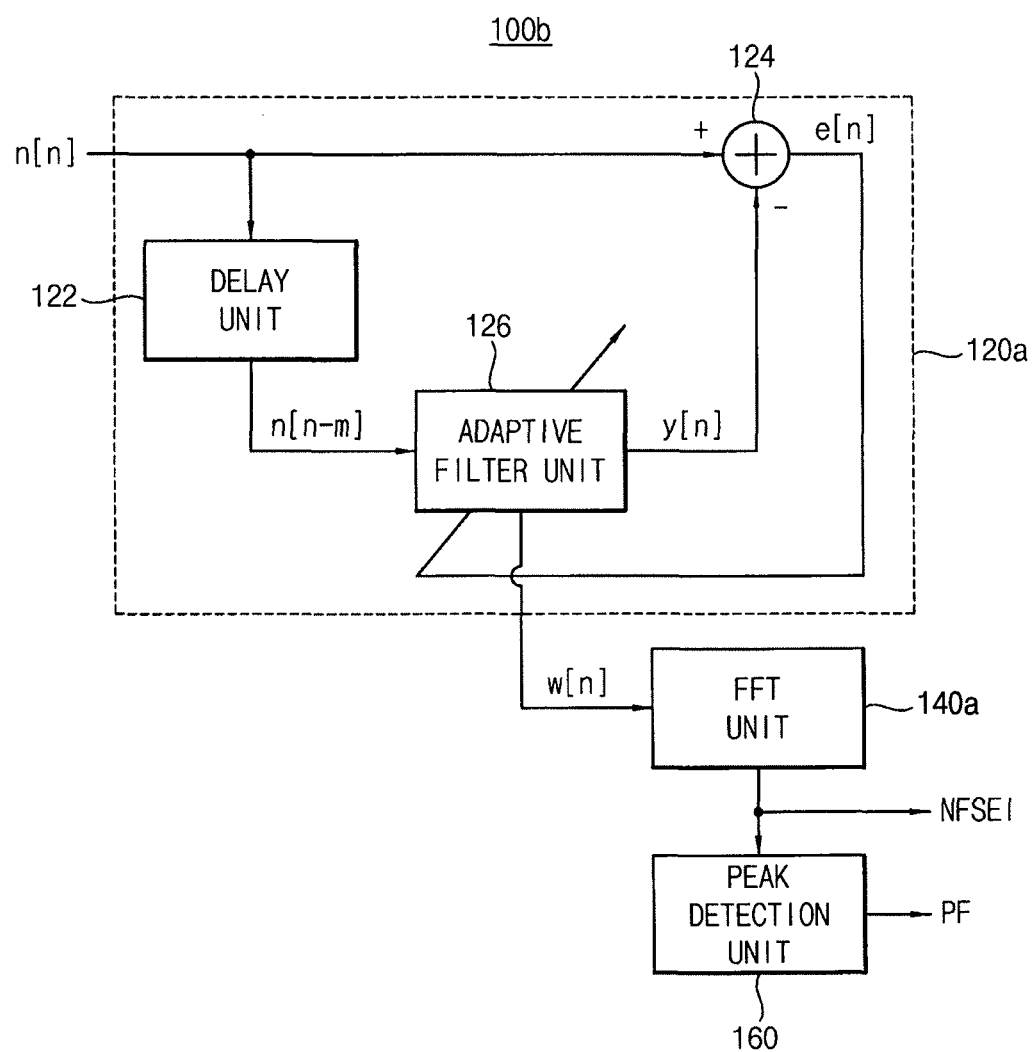
FIG. 5 illustrates a block diagram of another example of the noise spectrum estimator of FIG. 1.

FIG. 5 illustrates a block diagram of another example of the noise spectrum estimator of FIG. 1.

In the example embodiment shown in FIG. 5, a noise spectrum estimator 100b for a touch panel includes an adaptive impulse response generation unit, an estimation unit, and a peak detection unit 160. The adaptive impulse response generation unit may include an adaptive line enhancer filter 120a, and the estimation unit may include a FFT unit 140a.

In comparison with the noise spectrum estimator 100a of FIG. 2, the noise spectrum estimator 100b may further include the peak detection unit 160. The peak detection unit 160 may detect first peak frequencies PF by analyzing the noise frequency spectrum estimation information NFSEI.

As will be described below with reference to FIG. 8, the noise spectrum estimator according to example embodiments may be included in a touch screen device and may communicate with a touch panel control unit. When the touch screen device includes the noise spectrum estimator 100a of FIG. 2, the touch panel control unit included in the touch screen device may only receive the noise frequency spectrum estimation information NFSEI from the noise spectrum estimator 100a. In this embodiment, the touch panel control unit may detect the first peak frequencies by analyzing the noise frequency spectrum estimation information NFSEI. When the touch screen device includes the noise spectrum estimator 100b of FIG. 5, the touch panel control unit included in the touch screen device may receive both the noise frequency spectrum estimation information NFSEI and the first peak frequencies PF from the noise spectrum estimator 100b. In this embodiment, the touch panel control unit may determine a driving frequency of a touch panel based on the first peak frequencies PF without additional calculations. Accordingly, the noise spectrum estimator 100b may reduce the amount of calculation of the touch panel control unit included in the touch screen device.

Although FIGS. 2 and 5 illustrate the adaptive impulse response generation unit including the adaptive line enhancer filter, the adaptive impulse response generation unit may include an adaptive noise cancelling filter.

Figure 6:
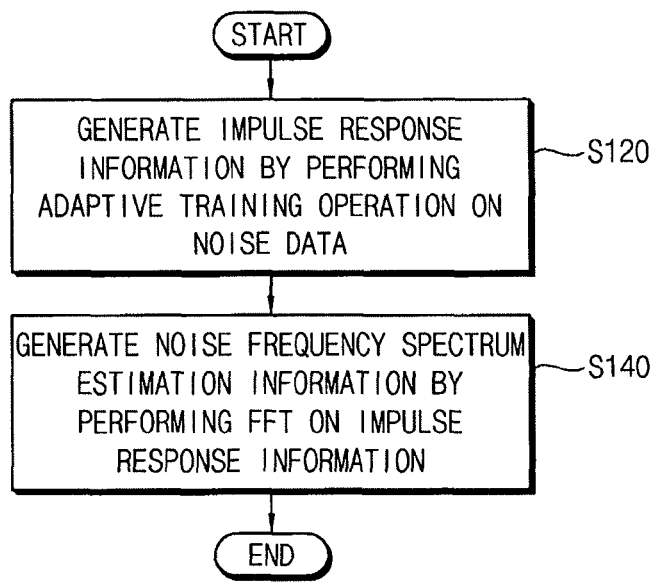
FIG. 6 illustrates a flowchart of a method of estimating noise spectrum for a touch panel according to example embodiments.

FIG. 6 illustrates a flowchart of a method of estimating noise spectrum for a touch panel according to example embodiments.

Referring to FIGS. 1 and 6, in the method of estimating the noise spectrum for the touch panel according to example embodiments, impulse response information IRI may be generated by performing an adaptive training operation on noise data NDATA (operation s120). The noise data NDATA may be generated by sampling a plurality of noise signals received from the touch panel. Noise frequency spectrum estimation information NFSEI may be generated by performing a FFT on the impulse response information IRI (operation s140). The noise frequency spectrum estimation information NFSEI is associated with the noise data NDATA. In the method according to example embodiments, first peak frequencies detected based on the noise frequency spectrum estimation information NFSEI may be substantially the same as second peak frequencies obtained by directly performing the FFT on the noise data NDATA. Accordingly, the characteristics of the noises in the touch panel may be accurately and efficiently analyzed.

Figure 7:
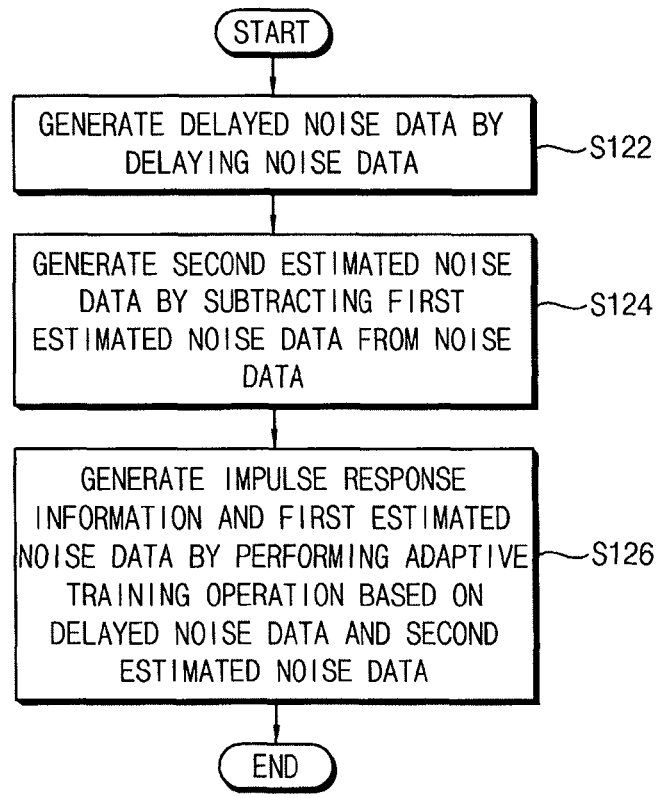
FIG. 7 illustrates a flowchart of an example of generating impulse response information in FIG. 6.

FIG. 7 illustrates a flowchart of an example of generating impulse response information in FIG. 6.

Referring to FIGS. 1, 2, 6, and 7, in the operation s120 in FIG. 6, delayed noise data n[n−m] may be generated by delaying noise data n[n] (operation s122). Second estimated noise data e[n] may be generated by subtracting first estimated noise data y[n] from the noise data n[n] (operation s124). Impulse response information w[n] and the first estimated noise data y[n] may be generated by performing the adaptive training operation based on the delayed noise data n[n−m] and the second estimated noise data e[n] (operation s126). For example, a LMS algorithm or a RLS algorithm may be applied in the adaptive training operation.

Figure 8:
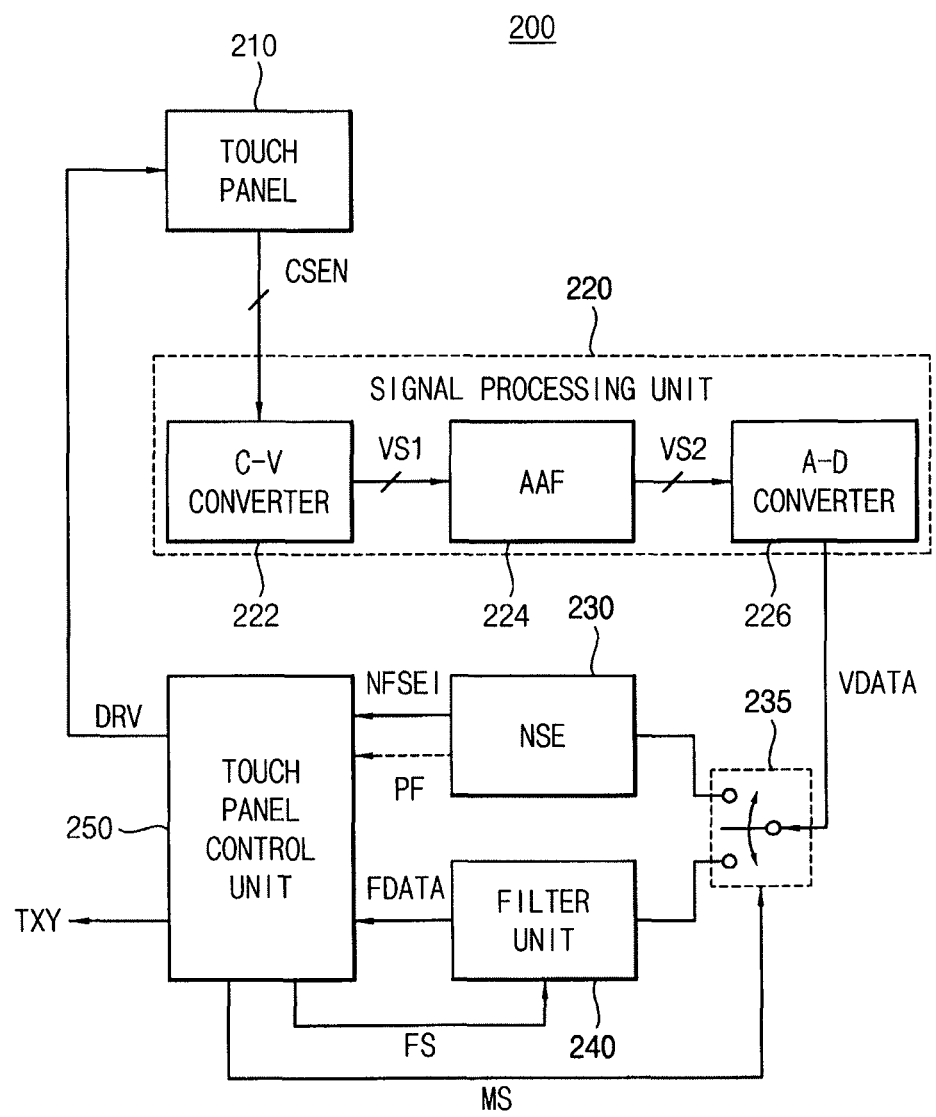
FIG. 8 illustrates a block diagram of a touch screen device according to example embodiments.

FIG. 8 illustrates a block diagram of a touch screen device according to example embodiments.

In the example embodiment shown in FIG. 8, a touch screen device 200 includes a touch panel 210, a signal processing unit 220, a noise spectrum estimator 230, a filter unit 240, and a touch panel control unit 250. The touch screen device 200 may further include a switch unit 235.

The touch screen device 200 according to example embodiments may operate in two modes: a first operation mode (e.g., a noise sensing mode) and a second operation mode (e.g., a touch sensing mode). The touch screen device 200 may analyze the characteristics of the noises in the touch panel 210 in the noise sensing mode, and may determine a touch point on the touch panel 210 by sensing respective touch events (e.g., touch input actions) in the touch sensing mode.

In an example embodiment, the touch panel 210 includes a plurality of panel points for sensing respective input touch events. The touch panel 210 may be configured to sense a plurality of touch events performed by contacts on the plurality of panel points. The touch events may include a single-touch, in which a single panel point in the touch panel 210 is touched, and a multi-touch, in which a multiple panel points in the touch panel 210 are touched substantially at the same time. For example, the touch panel 210 may be a capacitive touch panel and may generate a plurality of sensing signals CSEN by sensing changes of capacitances of the touch panel 210.

Figure 9A:
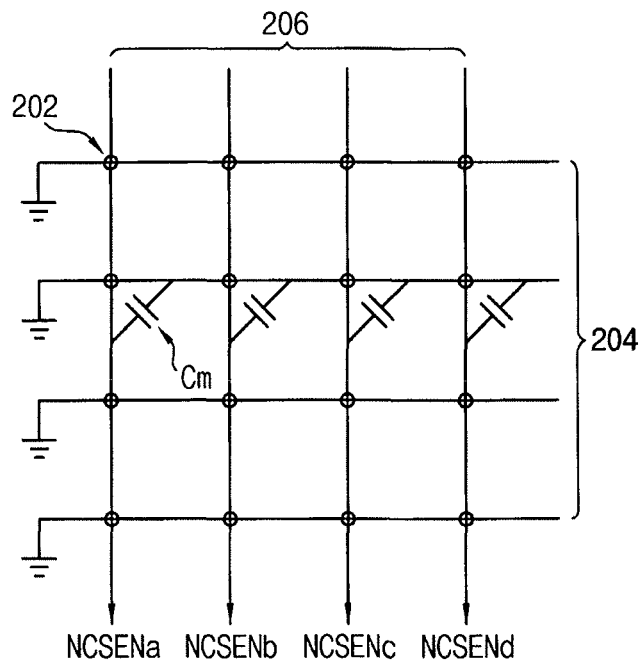
FIGS. 9A and 9B illustrate diagrams of an operation of a touch panel included in the touch screen device of FIG. 8.
Figure 9B:
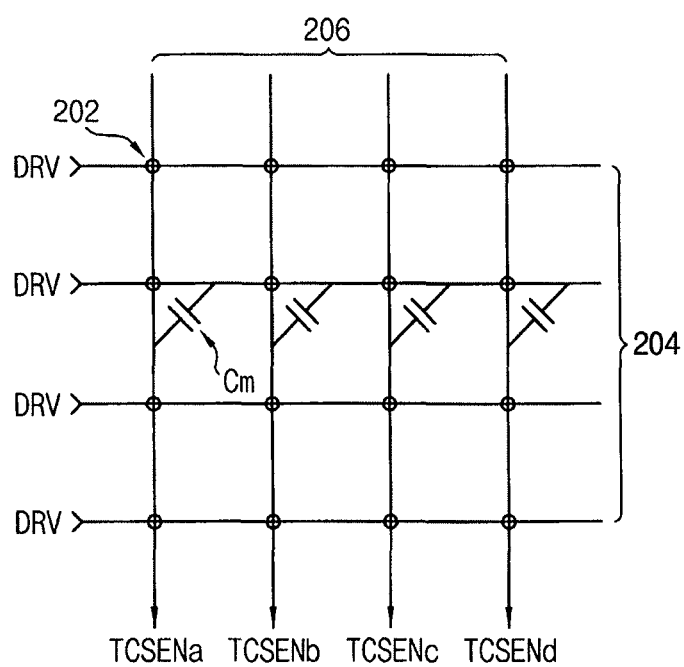

FIGS. 9A and 9B illustrate diagrams for describing an operation of a touch panel included in the touch screen device of FIG. 8.

Referring to FIGS. 9A and 9B, the touch panel 210 may include a plurality of pixels 202 that are arranged in a matrix of a plurality of rows 204 and a plurality of columns 206. The plurality of pixels 202 may correspond to the plurality of panel points. Each position of the pixels 202 on the touch panel 210 may be designated by (x, y) where x indicates a row coordinate and y indicates a column coordinate. The touch point may be determined based on each position of the pixels 202 on the touch panel 210. The coordinates to designate the panel point are not limited to a combination of orthogonal coordinates based on coordinate axes perpendicular to each other; any suitable coordinate system may be used to designate the coordinates of the panel points. For example, an axis in a diagonal direction may be used to designate one coordinate. As such, a combination of two arbitrary coordinates may be used to designate the position of the panel point on the touch panel 210.

In an implementation, the plurality of rows 204 may operate as a plurality of driving channels of the touch panel 210, and the plurality of columns 206 may operate as a plurality of sensing channels of the touch panel 210. The driving channels and the sensing channels may perform different operations depending on the operation modes of the touch screen device 200. For example, as illustrated in FIG. 9A, a ground voltage may be applied to the driving channels, and a plurality of noise sensing signals NCSENa, NCSENb, NCSENc, NCSENd may be output from the sensing channels in the noise sensing mode. The sensing channels may generate the noise sensing signals NCSENa, NCSENb, NCSENc, NCSENd in the noise sensing mode by sensing the changes of the capacitances of the touch panel 210, e.g., the changes of mutual capacitances Cm between the driving channels and the sensing channels in response to the noises. As illustrated in FIG. 9B, a driving signal DRV may be applied to the driving channels, and a plurality of touch sensing signals TCSENa, TCSENb, TCSENc, TCSENd may be output from the sensing channels in the touch sensing mode. The sensing channels may generate the touch sensing signals TCSENa, TCSENb, TCSENc, TCSENd in the touch sensing mode by sensing the changes of the capacitances of the touch panel 210, e.g., the changes of the mutual capacitances Cm between the driving channels and the sensing channels in response to the touch events. The number of the noise sensing signals NCSENa, NCSENb, NCSENc, NCSENd and the number of the touch sensing signals TCSENa, TCSENb, TCSENc, TCSENd may be substantially the same as the number of the sensing channels, respectively.

Although FIGS. 9A and 9B illustrate the touch panel including four driving channels and four sensing channels, the number of the driving channels and the number of the sensing channels are not limited thereto.

In the example embodiment shown in FIG. 8, the signal processing unit 220 generates voltage data VDATA based on the plurality of sensing signals CSEN received from the touch panel 210. As described above with reference to FIGS. 9A and 9B, the plurality of sensing signals CSEN may be the plurality of noise sensing signals NCSENa, NCSENb, NCSENc, NCSENd in the noise sensing mode, and may be the plurality of touch sensing signals TCSENa, TCSENb, TCSENc, TCSENd in the touch sensing mode. Thus, the voltage data VDATA may be noise data in the noise sensing mode and may be touch data in the touch sensing mode.

The signal processing unit 220 may include a capacitive-to-voltage (C-V) converter 222, an anti-aliasing filter 224, and an analog-to-digital (A-D) converter 226.

The C-V converter 222 may generate a plurality of first voltage signals VS1 based on the plurality of sensing signals CSEN. For example, the C-V converter 222 may convert the sensing signals CSEN, which correspond to the changes of the capacitances sensed by the sensing channels of the touch panel 210, into the first voltage signals VS1.

The anti-aliasing filter 224 may generate a plurality of second voltage signals VS2 based on the plurality of first voltage signals VS1. For example, the anti-aliasing filter 224 may minimize aliasing (which may occur when a high-resolution signal is converted into a low-resolution signal) in the first voltage signals VS1 to generate the second voltage signals VS2. The number of the first voltage signals VS1 and the number of the second voltage signals VS2 may be substantially the same as the number of the sensing channels, respectively.

The A-D converter 226 may generate the voltage data VDATA based on the plurality of second voltage signals VS2. For example, the A-D converter 226 may convert the second voltage signals VS2 corresponding to analog values into the voltage data VDATA corresponding to digital values.

Figure 10:
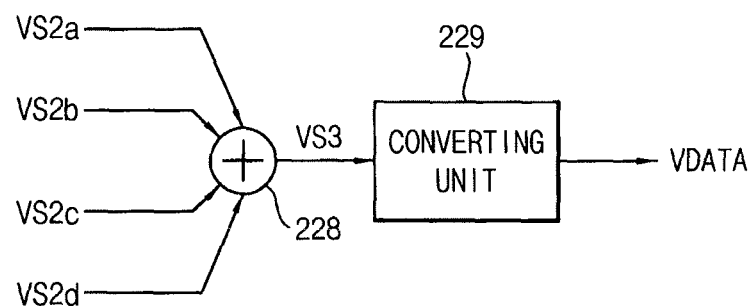
FIG. 10 illustrates a block diagram of an example of an analog-to-digital converter included in the touch screen device of FIG. 8.

FIG. 10 illustrates a block diagram of an example of an analog-to-digital converter included in the touch screen device of FIG. 8.

Referring to FIG. 10, the A-D converter 226 may include a calculation unit 228 and a converting unit 229.

The calculation unit 228 may generate a third voltage signal VS3 by adding up the plurality of second voltage signals VS2a, VS2b, VS2c, VS2d. The converting unit 229 may generate the voltage data VDATA by performing an A-D conversion on the third voltage signal VS3.

Although FIG. 10 illustrates the calculation unit 228 adding up all of the second voltage signals VS2a, VS2b, VS2c, VS2d, the calculation unit included in the A-D converter 226 may generate the third voltage signal VS3 by selectively adding up at least two of the plurality of second voltage signals VS2a, VS2b, VS2c, VS2d to reduce an amount of calculation.

In the example embodiments shown in FIG. 8, the noise spectrum estimator 230 generates noise frequency spectrum estimation information NFSEI based on the voltage data VDATA in the noise sensing mode. For example, the noise spectrum estimator 230 may generate the noise frequency spectrum estimation information NFSEI based on the noise data (the voltage data VDATA may be the noise data in the noise sensing mode).

The noise spectrum estimator 230 may be, e.g., the noise spectrum estimator 100 of FIG. 1, the noise spectrum estimator 100a of FIG. 2, or the noise spectrum estimator 100b of FIG. 5. For example, the noise spectrum estimator 230 may include an adaptive impulse response generation unit and an estimation unit. The adaptive impulse response generation unit may generate impulse response information by performing an adaptive training operation on the voltage data VDATA (e.g., the noise data). The estimation unit may generate the noise frequency spectrum estimation information NFSEI by performing a FFT on the impulse response information. The adaptive impulse response generation unit may include an adaptive line enhancer filter, and the estimation unit may include a FFT unit. For another example, the noise spectrum estimator 230 may further include a peak detection unit. The peak detection unit may detect peak frequencies PF by analyzing the noise frequency spectrum estimation information NFSEI. The peak frequencies PF may be provided to the touch panel control unit 250.

The filter unit 240 may include a plurality of filters. The filter unit 240 may select from among the plurality of filters based on a filter selection signal FS and may generate filtered data FDATA by filtering the voltage data VDATA based on the selected filter in the touch sensing mode. For example, the filter unit 240 may generate the filtered data FDATA based on the touch data (the voltage data VDATA may be the touch data in the touch sensing mode).

Figure 11:
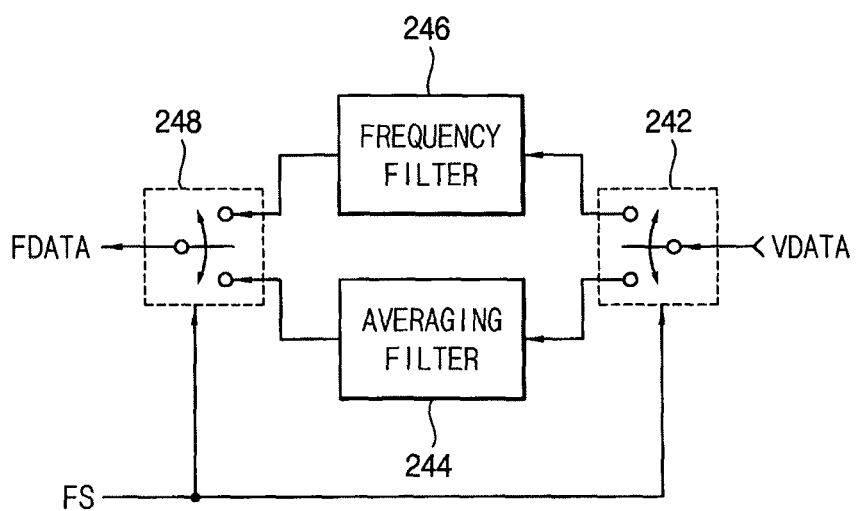
FIG. 11 illustrates a block diagram of an example of a filter unit included in the touch screen device of FIG. 8.

FIG. 11 illustrates a block diagram of an example of a filter unit included in the touch screen device of FIG. 8.

Referring to FIG. 11, the filter unit 240 may include an averaging filter 244 and a frequency filter 246. The filter unit 240 may also include a first switch unit 242 and a second switch unit 248.

The filter unit 240 may select from among the averaging filter 244 and the frequency filter 246 based on the filter selection signal FS. For example, when the filter selection signal FS has a first logic level, the first and second switch units 242 and 248 may be connected to the averaging filter 244, respectively, and the averaging filter 244 may generate the filtered data FDATA by filtering the voltage data VDATA (e.g., the touch data). When the filter selection signal FS has a second logic level, the first and second switch units 242 and 248 may be connected to the frequency filter 246, respectively, and the frequency filter 246 may generate the filtered data FDATA by filtering the voltage data VDATA (e.g., the touch data). In an implementation, the first logic level may be a logic high level, and the second logic level may be a logic low level.

In an example embodiment, the averaging filter 244 may reduce nondominant noise components (e.g., random noise components) in the touch data, and the frequency filter 246 may reduce dominant noise components (e.g., periodic noise components) in the touch data. The periodic noise components may occur by a display panel (not shown) and/or a battery (not shown) included in the touch screen device 200. For example, the frequency filter 246 may include a FIR filter or an infinite impulse response (IIR) filter. The detailed operation of the filter unit 240 will be described below in connection with the touch panel control unit 250.

In the example embodiment shown in FIG. 8, the touch panel control unit 250 generates the filter selection signal FS by analyzing the noise frequency spectrum estimation information NFSEI in the noise sensing mode. In the noise sensing mode, the touch panel control unit 250 may detect peak frequencies corresponding to noise peak points by analyzing the noise frequency spectrum estimation information NFSEI and may generate the filter selection signal FS based on the analysis results. For example, when the noise frequency spectrum estimation information NFSEI does not include the noise peak points, e.g., when it is determined based on the analysis results that the noise frequency spectrum estimation information NFSEI corresponds to uniform distribution, the touch panel control unit 250 may recognize that the noises in the touch panel 210 correspond to the random noise components and may generate the filter selection signal FS that has the first logic level for eliminating the random noise components from the touch data. The filter unit 240 may select the averaging filter 244 in FIG. 11 based on the filter selection signal FS having the first logic level. For another example, when the noise frequency spectrum estimation information NFSEI includes the noise peak points, e.g., when it is determined based on the analysis results that the noise frequency spectrum estimation information NFSEI corresponds to nonuniform distribution, the touch panel control unit 250 may recognize that the noises in the touch panel 210 correspond to the periodic noise components and may generate the filter selection signal FS that has the second logic level for eliminating the periodic noise components from the touch data. The filter unit 240 may select the frequency filter 246 in FIG. 11 based on the filter selection signal FS having the second logic level.

In addition, in the noise sensing mode, the touch panel control unit 250 may determine a frequency of the driving signal DRV by analyzing the noise frequency spectrum estimation information NFSEI. For example, when the peak frequencies are not detected, the touch panel control unit 250 may determine the frequency of the driving signal DRV as a predetermined first frequency. When the peak frequencies are detected and are not adjacent to the first frequency, the touch panel control unit 250 may determine the frequency of the driving signal DRV as the first frequency. For another example, when the peak frequencies are detected and are adjacent to the first frequency, the touch panel control unit 250 may determine the frequency of the driving signal DRV except the peak frequencies. In other words, the touch panel control unit 250 may determine the frequency of the driving signal DRV as a second frequency different from the first frequency.

In an implementation, the touch panel control unit 250 provides the driving signal DRV to the touch panel 210 in the touch sensing mode. When the touch events are performed on the touch panel 210, the sensing signals CSEN (e.g., the touch sensing signals), the voltage data VDATA (e.g., the touch data) and the filtered data FDATA may be sequentially generated, and the touch panel control unit 250 may determine a touch point Txy among the panel points based on the filtered data FDATA in the touch sensing mode. Algorithms for determining the touch point on the touch panel 210 may be suitably selected from known algorithms.

In an example embodiment, the touch panel control unit 250 may generate a mode selection signal MS to determine the operation mode of the touch screen device 200. For example, when the mode selection signal MS has the first logic level, the touch screen device 200 may operate in the noise sensing mode, and the switch unit 235 may be connected to the noise spectrum estimator 230. When the mode selection signal MS has the second logic level, the touch screen device 200 may operate in the touch sensing mode, and the switch unit 235 may be connected to the filter unit 240. In some embodiments, when the touch screen device 200 is powered on, the touch screen device 200 may operate in the noise sensing mode at first to analyze the characteristics of the noises in the touch panel 210, and then the touch screen device 200 may operate in the touch sensing mode to detect the touch events on the touch panel 210 and to determine the touch point Txy. In other embodiments, the touch screen device 200 may operate in the noise sensing mode according to a predetermined cycle to update the characteristics of the noises in the touch panel 210.

In an example embodiment, the touch panel control unit 250 may determine whether the filtered data FDATA correspond to the noises in the touch sensing mode. When it is determined that the filtered data FDATA correspond to the noises, the touch panel control unit 250 may change the operation mode of the touch screen device 200 from the touch sensing mode to the noise sensing mode based on the mode selection signal MS. For example, the touch panel control unit 250 may change a logic level of the mode selection signal MS. When it is determined that the filtered data do not correspond to the noises, the touch panel control unit 250 may maintain the operation mode of the touch screen device 200. For example, the touch panel control unit 250 may determine the touch point Txy among the panel points based on the filtered data FDATA.

The touch screen device 200 according to example embodiments may include the noise spectrum estimator 230 that is substantially the same as the noise spectrum estimator 100 of FIG. 1. Accordingly, the touch screen device 200 may accurately and efficiently analyze the characteristics of the noises in the touch panel 210. In addition, the touch screen device 200 may determine the frequency of the driving signal DRV for driving the touch panel 210 and select one of the filters for filtering the touch data by analyzing the noise frequency spectrum estimation information NFSEI. For example, the touch screen device 200 may determine the frequency of the driving signal DRV except the peak frequencies, may detect the touch point Txy based on the averaging filter 244 when the noises in the touch screen 210 correspond to the random noise components, and may detect the touch point Txy based on the frequency filter 246 when the noises in the touch screen 210 correspond to the periodic noise components. Accordingly, the touch screen device 200 may accurately and efficiently detect the touch events.

Figure 12:
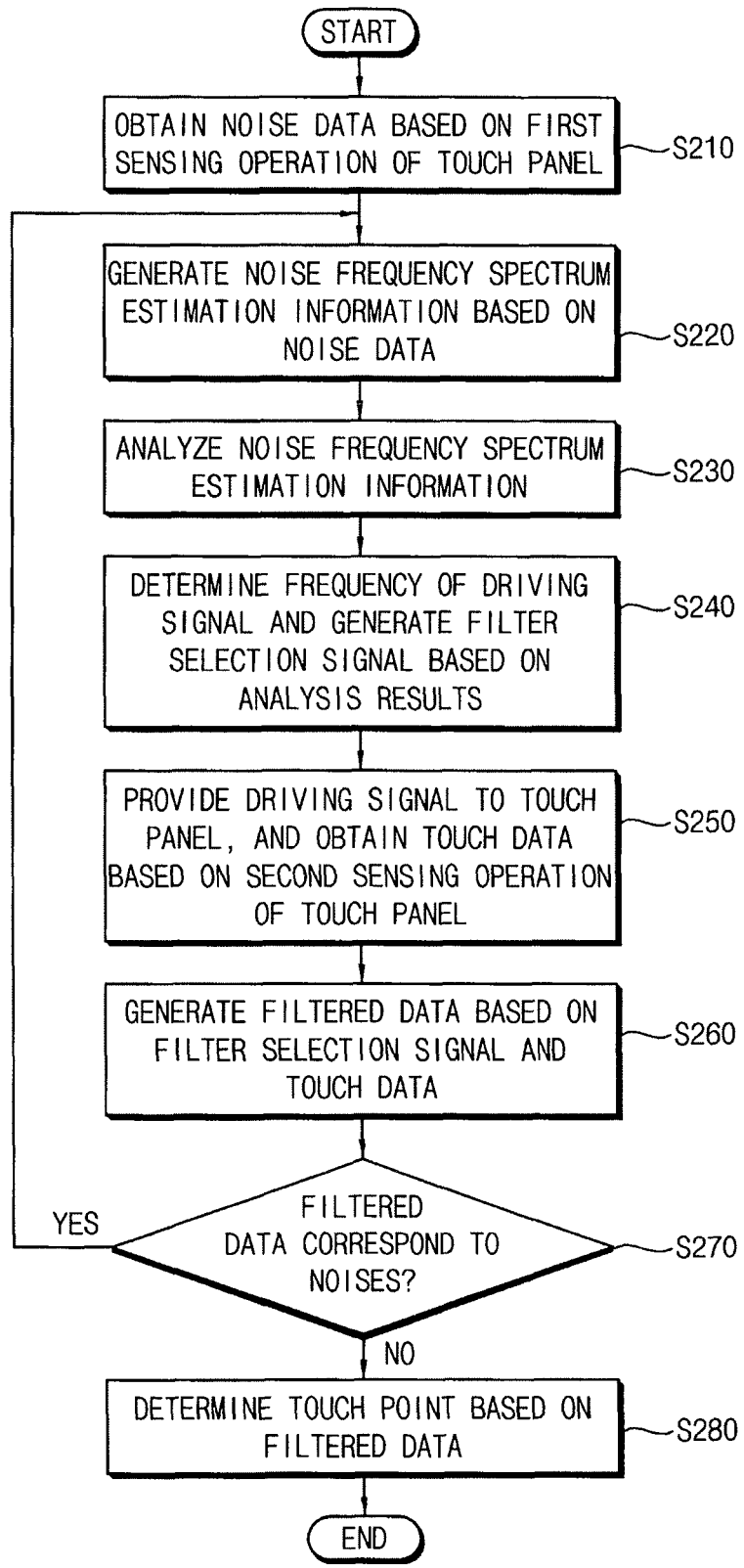
FIG. 12 illustrates a flowchart of a method of operating a touch screen device according to example embodiments.

FIG. 12 illustrates a flowchart of a method of operating a touch screen device according to example embodiments.

Referring to FIGS. 8 and 12, in the method of operating the touch screen device according to example embodiments, noise data may be obtained based on a first sensing operation of the touch panel 210 in a noise sensing mode (operation s210). For example, a ground voltage may be applied to a plurality of driving channels of the touch panel 210. A plurality of first voltage signals VS1 may be generated by performing a C-V conversion on a plurality of sensing signals CSEN (e.g., a plurality of noise sensing signals) that correspond to changes of capacitances of the touch panel 210 in response to noises in the touch panel 210. A plurality of second voltage signals VS2 may be generated by performing an anti-aliasing on the first voltage signals VS1. Voltage data VDATA (corresponding to the noise data in the noise sensing mode) may be generated by performing an A-D conversion on the second voltage signals VS2.

Noise frequency spectrum estimation information NFSEI may be generated based on the noise data (operation s220). The operation s220 may be performed based on the method of estimating the noise spectrum for the touch panel according to example embodiments, which is described above with reference to FIGS. 6 and 7.

The noise frequency spectrum estimation information NFSEI may be analyzed to generate analysis results (operation s230). A frequency of a driving signal DRV may be determined and a filter selection signal FS may be generated based on the analysis results (operation s240). For example, peak frequencies may be detected by analyzing the noise frequency spectrum estimation information NFSEI. The frequency of the driving signal DRV may be determined based on the peak frequencies (e.g., except the peak frequencies). The filter selection signal FS may be generated based on whether the peak frequencies are detected. The averaging filter 244 in FIG. 11 for eliminating random noise components or the frequency filter 246 in FIG. 11 for eliminating periodic noise components may be selected based on the filter selection signal FS.

After the frequency of the driving signal DRV is determined and the filter selection signal FS is generated, the driving signal DRV may be provided to the touch panel 210 in a touch sensing mode, and touch data may be obtained based on a second sensing operation of the touch panel 210 in the touch sensing mode (operation s250). For example, the driving signal DRV may be applied to the plurality of driving channels of the touch panel 210. The plurality of first voltage signals VS1 may be generated by performing the C-V conversion on the plurality of sensing signals CSEN (e.g., a plurality of touch sensing signals) that correspond to changes of capacitances of the touch panel 210 in response to touch events on the touch panel 210. The plurality of second voltage signals VS2 may be generated by performing the anti-aliasing on the first voltage signals VS1. The voltage data VDATA (corresponding to the touch data in the touch sensing mode) may be generated by performing the A-D conversion on the second voltage signals VS2.

Filtered data FDATA may be generated based on the filter selection signal FS and the touch data (operation s260). For example, one of the averaging filter 244 in FIG. 11 and the frequency filter 246 in FIG. 11 may be selected based on the filter selection signal FS, and the filtered data FDATA may be generated by filtering the touch data based on the selected filter.

Based on a predetermined criterion, it may be determined whether the filtered data FDATA correspond to the noises (operation s270). When it is determined that the filtered data FDATA correspond to the noises (operation s270: Yes), the operation mode of the touch screen device 200 may be changed from the touch sensing mode to the noise sensing mode and the operations S220, S230, S240, S250, S260 and S270 may be repeated (e.g., if the touch data are not generated based on the touch events but generated based on the noises). When it is determined that the filtered data FDATA do not correspond to the noises (operation s270: No), a touch point Txy among a plurality of panel points in the touch panel 210 may be determined based on the filtered data FDATA (e.g., if the touch data are generated based on the touch events) (operation s280). In some embodiments, the operation s270 may be omitted.

Figure 13:
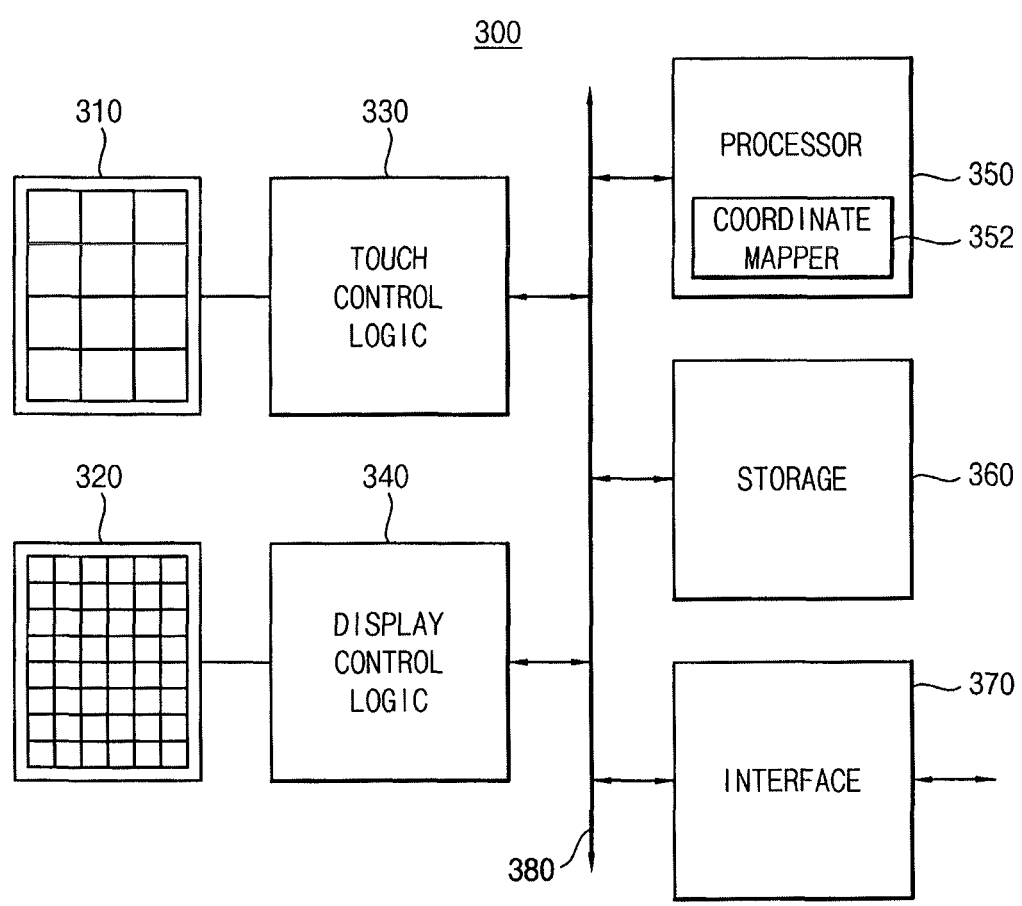
FIG. 13 illustrates a block diagram of a touch screen device according to example embodiments.

FIG. 13 illustrates a block diagram of a touch screen device according to example embodiments.

In the example embodiment shown in FIG. 13, a touch screen device 300 includes a touch panel 310, a display panel 320, a touch control logic 330, a display control logic 340, a processor 350, a storage 360, an interface 370, and a bus 380.

The touch panel 310 may be configured to sense a plurality of touch events performed by contacts on a plurality of panel points. The display panel 320 may be configured to display an image and may be implemented with various panels such as liquid crystal display (LCD), light emitting diode (LED), organic LED (OLED), etc. The display panel 320 may be formed under the touch panel 310. For example, the touch panel 310 and the display panel 320 may be superimposed to form a touch screen.

The touch control logic 330 may control the operation of the touch panel 310 and provide outputs of the touch panel 310 to the processor 350. The touch control logic 330 may include, e.g., a signal processing unit, a noise spectrum estimator, a filter unit, and a touch panel control unit, which are described above with reference to FIG. 8. For example, in a noise sensing mode, the touch control logic 330 may determine a driving frequency of the touch panel 310 and may select one of a plurality of filters by analyzing characteristics of noises in the touch panel 310 based on an adaptive training operation and a FFT. In a touch sensing mode, the touch panel 310 may determine a touch point among the panel points by detecting the touch events based on the driving frequency and the selected filter.

In some embodiments, at least a portion of the signal processing unit, the noise spectrum estimator, the filter unit, and the touch panel control unit described with reference to FIG. 8 may be implemented as hardware and may be included in the touch control logic 330. In other embodiments, at least a portion of the signal processing unit, the noise spectrum estimator, the filter unit, and the touch panel control unit may be implemented as software and may be stored in the storage 360 in a form of program codes that may be executed by the processor 350.

The display control logic 340 may be configured to control the display panel 320 to display an image thereon. Although not illustrated in FIG. 13, the display control logic 340 may include a source driver, a gray-scale voltage generator, a memory device, a timing controller, a gate driver, a power supplier, an image interface, etc. Image data to be displayed on the display panel 320 may be provided from an external host (not shown) through the image interface and may be stored in the memory device. The image data may be converted to appropriate analog signals based on gray-scale voltages from the gray-scale voltage generator. The source driver and the gate driver may drive the display panel 320 in synchronization with signals (e.g., a vertical synchronization signal, a horizontal synchronization signal, etc.) from the timing controller.

The processor 350 may be configured to control overall operations of the touch screen device 300. Program codes and data accessed by the processor 350 may be stored in the storage 360. The interface 370 may have appropriate configuration according to external devices and/or systems communicating with the touch screen device 300.

The processor 350 may include a coordinate mapper 352. The position on the touch panel 310 and the position on the display panel 320 may be mapped to each other. The coordinate mapper 352 may extract mapped coordinates of touch pixels in the display panel 320, where the touch pixels in the display panel 320 correspond to the touch points in the touch panel 310. Through such mapping of the positions or coordinates, the user may perform input actions including, e.g., a single-touch action for selecting an icon or a menu item displayed on the touch screen, and a multi-touch action such as a drag, a pinch, a stretch, etc.

The processor 350 may perform various calculations or tasks. According to example embodiments, the processor 350 may be a microprocessor or a central processing unit (CPU). The processor 350 may communicate with the storage 360 via the bus 380, and may communicate with the external host through the interface 370 coupled to the bus 380. The bus 380 may include an extended bus, such as a peripheral component interconnection (PCI) bus.

The storage 360 may store data for operating the touch screen device 300. For example, the storage 360 may be implemented with a dynamic random access memory (DRAM) device, a mobile DRAM device, a static random access memory (SRAM) device, a phase random access memory (PRAM) device, a ferroelectric random access memory (FRAM) device, a resistive random access memory (RRAM) device, and/or a magnetic random access memory (MRAM) device. Furthermore, the storage 360 may include a solid state drive (SSD), a hard disk drive (HDD), a CD-ROM, etc. The touch screen device 300 may further include an input device such as a keyboard, a keypad, a mouse, etc. and an output device such as a printer, etc.

The touch screen device 300 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

The interface 370 may include a radio frequency (RF) chip for performing a wireless communication with an external host. A physical layer (PHY) of the external host and a physical layer (PHY) of the RF chip may perform data communications based on a MIPI DigRF. In addition, the interface 370 may be configured to perform communications using an ultra wideband (UWB), a wireless local area network (WLAN), a worldwide interoperability for microwave access (WIMAX), etc. The touch screen device 300 may further include a global positioning system (GPS), a MIC, a speaker, etc.

In an example embodiment, the touch screen device 300 may be coupled to the external host to form a touch screen system. The touch control logic 330 may provide touch information representing the operational state of the touch panel 310 to the display control logic 340 and/or may receive display information representing the operational timing of the display panel 320 from the display control logic 340. For example, the touch information may include an idle signal that is activated when the touch input action is not performed for a predetermined time. In this case, the display control logic 340 may enter a power-down mode in response to the idle signal. The display information may include a timing signal such as the horizontal synchronization signal and/or the vertical synchronization signal, and the operation timing of the touch panel 310 may be controlled based on the timing signal.

By way of summation and review, touch screen devices including touch panels are widely used in mobile applications. Similar to other electronic devices, noise may occur in the touch panel. Characteristics of noises in the mobile applications, e.g., characteristics of noises in the touch panels, may vary depending on changes of times and spaces. For best function of the touch screen devices, it is desirable to analyze the noises in the touch panel, and to cancel and/or remove the noises in the touch panel before touch events (e.g., touch input actions) on the touch panels are detected. However, it is not desirable for apparatuses that analyze, cancel, and/or remove the noises to have a relatively low operation speed (due to a relatively great amount of calculation) and/or a relatively large size (due to a relatively complex structure).

Example embodiments may provide a noise spectrum estimator designed to accurately and efficiently analyze noises in a touch panel. Example embodiments may also provide a touch screen device including the noise spectrum estimator and designed to accurately and efficiently detect touch events. The noise spectrum estimator according to example embodiments may generate the impulse response information by performing the adaptive training operation the noise data and generate the noise frequency spectrum estimation information by performing the FFT on the impulse response information, thereby reducing an amount of calculation, providing for a relatively simple structure, and accurately and efficiently analyzing the characteristics of the noises in the touch panel. The touch screen device including the noise spectrum estimator according to example embodiments may determine the driving frequency of the touch panel and select one of the filters for filtering the touch data by analyzing the noise frequency spectrum estimation information, thereby accurately and efficiently detecting the touch events.

The above described embodiments may be applicable to various devices and systems including a touch panel, and particularly to devices and systems such as a mobile phone, a smart phone, a personal digital assistant (PDA), a portable multimedia player (PMP), a digital camera, a camcorder, a personal computer (PC), a server computer, a workstation, a laptop, a digital television, a set-top-box, a music player, a portable game console, a navigation system, and/or a printer.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A noise spectrum estimator for a touch panel, comprising:
   an adaptive impulse response generator to generate impulse response information by performing an adaptive training operation on noise data, the noise data being generated by sampling a plurality of noise signals received from the touch panel; and
   an estimator to generate noise frequency spectrum estimation information associated with the noise data by performing a fast Fourier transform (FFT) on the impulse response information, wherein
   first peak frequencies corresponding to first noise peak points are substantially equal to second peak frequencies corresponding to second noise peak points, the first noise peak points being detected based on the noise frequency spectrum estimation information, the second noise peak points being obtained by directly performing the FFT on the noise data.

2. The noise spectrum estimator as claimed in claim 1, further comprising:
   a peak detector to detect the first peak frequencies by analyzing the noise frequency spectrum estimation information.

3. The noise spectrum estimator as claimed in claim 1, wherein the adaptive impulse response generator includes an adaptive line enhancer filter.

4. The noise spectrum estimator as claimed in claim 3, wherein the adaptive line enhancer filter includes:
   a delay to generate delayed noise data by delaying the noise data;
   a calculator to generate second estimated noise data by subtracting first estimated noise data from the noise data; and
   an adaptive filter to generate the impulse response information and the first estimated noise data by performing the adaptive training operation based on the delayed noise data and the second estimated noise data.

5. The noise spectrum estimator as claimed in claim 4, wherein a tab coefficient of the adaptive filter is substantially equal to a number of FFT points for the FFT performed by the estimator.

6. A touch screen device, comprising:
   a touch panel including a plurality of panel points for sensing respective input touch events;
   a signal processor to generate voltage data based on a plurality of sensing signals corresponding to changes of capacitances of the touch panel;
   a noise spectrum estimator to generate noise frequency spectrum estimation information based on the voltage data in a noise sensing mode, the voltage data including noise data in the noise sensing mode;
   a filter unit including a plurality of filters, the filter unit to select from among the plurality of filters based on a filter selection signal and generate filtered data by filtering the voltage data based on a selected filter in a touch sensing mode; and
   a touch panel controller to generate the filter selection signal by analyzing the noise frequency spectrum estimation information in the noise sensing mode, and to provide a driving signal to the touch panel and determine a touch point among the panel points based on the filtered data in the touch sensing mode, wherein the noise spectrum estimator includes:
   an adaptive impulse response generator to generate impulse response information by performing an adaptive training operation on the noise data in the noise sensing mode, the noise data being generated by sampling a plurality of noise signals received from the touch panel; and an estimator to generate the noise frequency spectrum estimation information by performing a fast Fourier transform (FFT) on the impulse response information in the noise sensing mode, wherein the filter unit includes an averaging filter and a frequency filter, the filter unit selecting the averaging filter based on the filter selection signal when the noise frequency spectrum estimation information corresponds to uniform distribution, and the filter unit selecting the frequency filter based on the filter selection signal when the noise frequency spectrum estimation information corresponds to nonuniform distribution.

7. The touch screen device as claimed in claim 6, wherein the frequency filter includes a filter selected from a finite impulse response (FIR) filter and an infinite impulse response (IIR) filter.

8. The touch screen device as claimed in claim 6, wherein the touch panel controller detects peak frequencies corresponding to noise peak points by analyzing the noise frequency spectrum estimation information in the noise sensing mode, and determines a frequency of the driving signal except the detected peak frequencies.

9. The touch screen device as claimed in claim 6, wherein the touch panel controller generates a mode selection signal to determine an operation mode of the touch screen device.

10. The touch screen device as claimed in claim 9, wherein the touch panel controller determines whether the filtered data correspond to noises in the touch sensing mode, the touch panel controller changing the operation mode of the touch screen device from the touch sensing mode to the noise sensing mode based on the mode selection signal when the filtered data correspond to the noises, and the touch panel controller determining the touch point among the panel points based on the filtered data when the filtered data do not correspond to the noises.

11. The touch screen device as claimed in claim 6, wherein the signal processor includes:

a capacitive-to-voltage converter to generate a plurality of first voltage signals based on the plurality of sensing signals;

an anti-aliasing filter to generate a plurality of second voltage signals based on the plurality of first voltage signals; and an analog-to-digital converter to generate the voltage data based on the plurality of second voltage signals.

12. The touch screen device as claimed in claim 11, wherein the analog-to-digital converter generates a third voltage signal by adding up at least two of the plurality of second voltage signals and generates the voltage data by performing an analog-to-digital conversion operation on the third voltage signal.

13. The touch screen device as claimed in claim 6, further comprising:

a display panel formed under the touch panel; and a display driver to control the display panel to display an image on the display panel.

14. A touch screen device having a panel to respond to a touch input, the panel having a touch sensor array, the device comprising:

a plurality of sensors in the touch sensor array, each sensor providing a respective voltage signal in response to a touch input thereto; and a noise spectrum estimator to receive voltage data from the respective voltage signals from the sensors, the noise spectrum estimator including:

an adaptive impulse response generator to generate impulse response information by performing an adaptive training operation on noise data of the voltage data, the noise data being generated by sampling a plurality of noise signals received from the sensors of the touch panel, the adaptive training operation including generating delayed noise data by delaying the noise data, generating first estimated noise data, and generating second estimated noise data by using the noise data and the first estimated noise data; and an estimator to generate noise frequency spectrum estimation information associated with the noise data by performing a fast Fourier transform (FFT) on the impulse response information, wherein the adaptive training operation is performed based on the delayed noise data and the second estimated noise data.

15. The device as claimed in claim 14, wherein the voltage data is derived from a change in capacitance in the sensors.

16. The device as claimed in claim 14, wherein at least one filter is applied to the voltage data so as to generate a signal indicative of an actual touch input, the at least one filter being selected from a group of one or more filters based on the noise frequency spectrum estimation information.

17. The device as claimed in claim 16, wherein the signal indicative of an actual touch input is used to generate a touch event in a microprocessor of the device.

18. The device as claimed in claim 14, wherein estimating the periodic noise component of the noise data using the adaptive filter includes processing the noise data using a finite impulse response filter.

19. The device as claimed in claim 14, wherein:

the first estimated noise data corresponds to a dominant noise component or a periodic noise component of the noise data, and the second estimated noise data corresponds to a non-dominant noise component or a random noise component of the noise data.

* * * * *